United States Patent Office 2,823,936
Patented Feb. 18, 1958

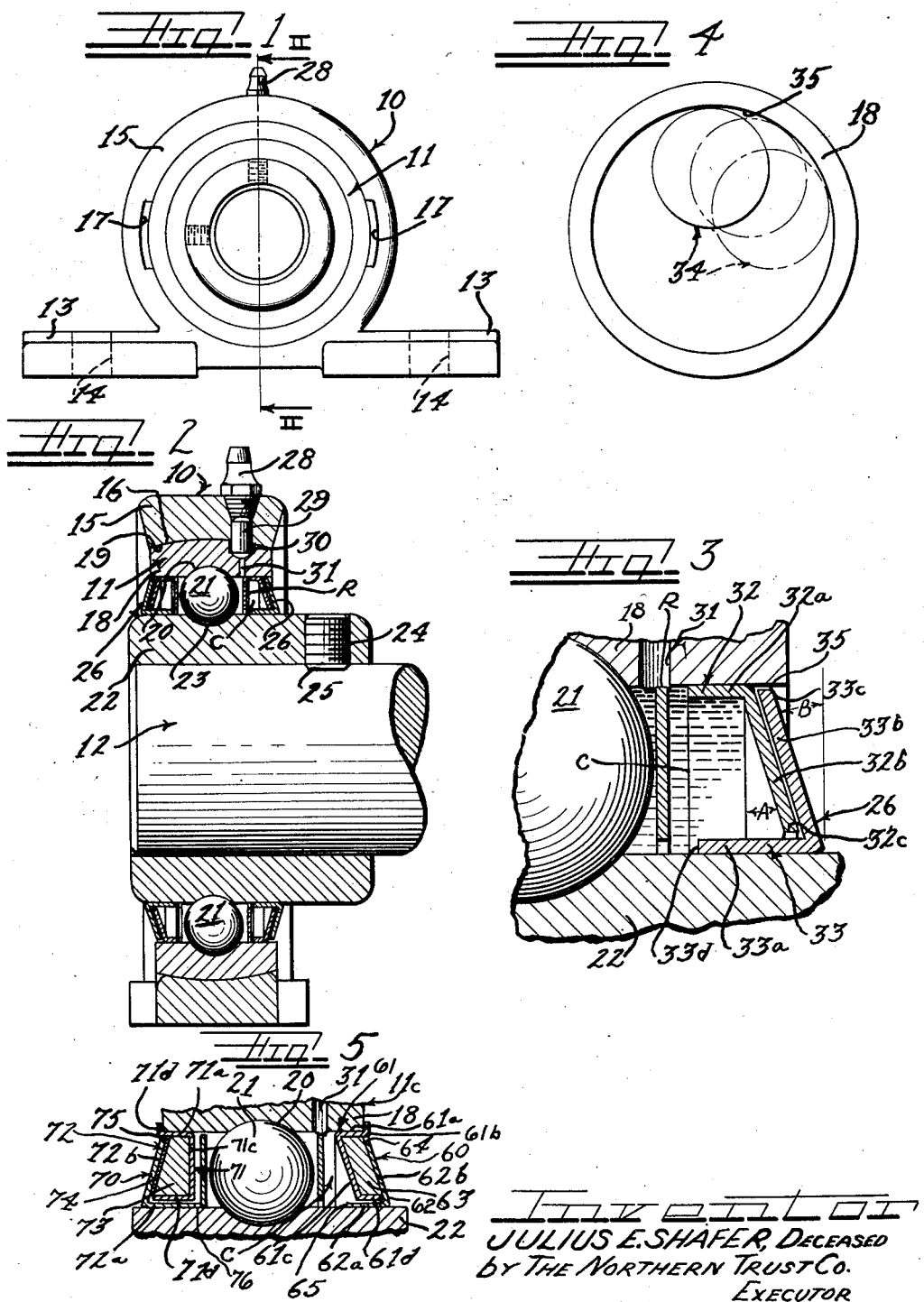

2,823,936

BEARING SEAL

Julius E. Shafer, deceased, late of Chicago, Ill., by The Northern Trust Company, executor, Chicago, Ill., assignor to John H. Shafer and Olin J. Shafer, both of Park Ridge, J. Arthur Gross, Winnetka, and The Northern Trust Company, Chicago, Ill., a corporation of Illinois, as trustees Original application December 27, 1949, Serial No. 135,051, now Patent No. 2,705,160, dated March 29, 1955. Divided and this application November 2, 1954, Serial No. 466,248

8 Claims. (Cl. 286—5)

This invention relates to sealed bearing units, and more specifically deals with dirt and lubricant seals for industrial anti-friction bearing units.

This application is a division of the Julius E. Shafer co-pending application entitled "Bearing seal," Serial No. 135,051, filed December 27, 1949, now U. S. Patent No. 2,705,160, issued on March 29, 1955.

The invention will hereinafter be described in connection with an industrial ball bearing unit mounted in a pillow block, but it should be understood that the seals of this invention are generally applicable to seal off the anti-friction element chamber of any type of anti-friction bearing without interfering with free relative rotation of the race rings of the unit.

In accordance with this invention, a metal retainer ring is pressed into the outer race ring of the bearing unit and extends inwardly into close proximity with the inner race ring. A metal flinger ring is pressed onto the inner race ring and has a base portion extending axially inward to form a sharp shoulder which will discharge grease away from the gap between the end of the retainer and the base. The flinger has a flange which extends radially outward and axially inward from the base into close-running clearance relationship with the inner surface of the outer race ring and this surface in the vicinity of the flinger flange edge is carefully sized relative to the flinger flange so that very close-running clearances of uniform magnitude are obtained. In one embodiment of the invention, the retainer is in close-running clearance parallel relation with the flinger flange. In another embodiment the retainer and flinger are spaced to form a chamber therebetween for receiving a flexible sealing ring.

An important feature of the invention resides in the accurate sizing of the outer end portions of the inner surface of the outer race ring of the bearing so that these portions will have spaced sealing relationship with the relatively rotating outer edge of the flinger flange.

Another feature of the invention resides in the provision of flat bases or rim flanges on metal sealing rings for forming the sole means of attaching the rings to a bearing unit to maintain overlapping flange portions of the rings in close-running clearance relationship.

It is, then, an object of the invention to provide a bearing seal composed of two metal rings each having flat rim portions and inclined flange portions adapted to be maintained in overlapped close-running clearance relationship by pressing the rim portions into or on the race rings of a bearing.

A still further object of the invention is to provide a seal for bearings wherein the outer race ring of the bearing has an accurately sized surface in close-running clearance relationship with the edge of a seal plate to enhance the sealing capacity thereof.

Another object of the invention is to provide an inexpensive seal for bearings by utilizing the sealing effect of a surface on the outer race ring of the bearing in addition to surfaces of the seal parts.

A still further object of the invention is to provide a bearing seal composed of two metal rings including a flinger ring having a flat inner rim and a sloping side wall together with a retainer ring having a flat outer rim and a side wall mating with the side wall of the flinger.

Other and further objects of this invention will be apparent to those skilled in the art from the following detailed description of the annexed sheets of drawings which, by way of preferred examples only, illustrate several embodiments of the invention.

On the drawings:

Figure 1 is a side elevational view of a sealed bearing unit according to this invention mounted in a one-piece pillow block;

Figure 2 is a somewhat enlarged vertical cross-sectional view, with parts in side elevation, taken substantially along the line II—II of Figure 1;

Figure 3 is a further enlarged fragmentary vertical cross-sectional view similar to Figure 2 but illustrating further details of the bearing seal;

Figure 4 is a front elevational view of an outer race ring for a bearing unit according to this invention illustrating the manner in which the outer edge portion of the inner surface of this ring is accurately ground to close tolerance limits for having predetermined close-running clearance relationship with the flinger of the seal of this invention; and Figure 5 is another fragmentary and broken cross-sectional view similar to Figure 3 but showing two additional seal embodiments.

As shown on the drawings:

The pillow block unit 10 of Figures 1 and 2 mounts a bearing unit 11 sealed in accordance with this invention, and this bearing unit 11, in turn, rotatably mounts a shaft 12 locked in the inner race ring thereof. The pillow block 10 has mounting feet 13, 13 with holes or slots 14, 14 therein to receive bolts (not shown) for securing the feet in position as desired. A one-piece annular strap 15 is integrally formed between the feet 13, 13 and has slots 17, 17 in the concave segmental spherical inner bearing portion 16 thereof which are in spaced opposed relationship to increase the width of the bearing wall 16 so that the unit 11 can be inserted horizontally through the slots 17 and then tilted into vertical position to be seated on the bearing wall 16. As shown in Figure 2, the outer race ring 18 of the bearing unit 11 has a convex segmental spherical outer wall 19 mating with the wall 16 of the strap 15 to retain the bearing unit 11 in tiltable relation in the pillow block. The inner surface of the outer race ring 18 is cylindrical and has a central ball groove 20 therearound for receiving a row of ball bearings 21.

The unit 11 includes an inner race ring or sleeve 22 which has a cylindrical outer face with a groove 23 therearound for receiving the ball elements 21. The shaft 12 extends through the bore of the ring 22 and at least one end of the ring projects beyond an end face of the outer ring 18. This projecting portion has several threaded radial holes 24 therethrough and set screws 25 are threaded through these holes to bite into the shaft 12 thereby fixedly locking the shaft and ring against relative rotation.

The row or ring of balls 21 holds the inner and outer race rings 18 and 22 in spaced concentric relation and the grooves 20 and 23 form races for the balls so that the rings are relatively rotatable. At the same time, the races and balls cooperate to hold the rings against relative axial movement. A bearing cage or ball retainer R holds the balls in circumferentially spaced relation and has a pocket for each ball as is customary.

A sealed chamber C is provided between the rings around the row of balls 21 by means of the seals 26 of this invention. Lubricant is supplied to this chamber through a fitting 28 which is threaded into the strap 15 of the pillow block. A locking pin or tube 29 projects from the strap 15 beneath the fitting 28 into a dimple 30 formed in the ring 18. A small bore 31 connects the bottom of this dimple with the chamber C. The pin and dimple relationship permits relative tilting of the ring 18 in the strap 15 but the pin at all times holds the fitting 28 in communication with the chamber C and prevents the ring 18 from rotating in the strap 15.

As best shown in Figure 3, each seal 26 includes a metal retainer ring or plate 32 and a metal flinger ring or plate 33. The retainer 32 has a flat outer rim 32a and a sloping side wall or flange 32b extending radially inward from the rim 32a and axially outward at an angle A therewith. This flange or side wall 32b terminates in a flat edge 32c closely adjacent to the inner race ring 22. The flinger 33 includes a flat inner rim or base 33a which is deeper or longer than the rim 32a of the retainer. This base 33a terminates in a side wall or flange 33b which extends radially outward and axially inward at an angle B from the vertical or right angle relationship with the base. The flange 33b terminates in a flat edge 33c in a closely spaced relationship with the outer race ring 18. The angles A and B are identical and are preferably 15°.

The flat rim 32a is sized for press fit relationship into the cylindrical inner circumferenece of the outer race ring 18 and the rim is sufficiently deep or long to hold the flange 32b against tilting when the rim is press fit into the ring. The flange 32a is forced into the ring 18 by a suitable press-fitting tool to a depth inwardly from the side face of the ring 18. The axial outer end portions of the cylindrical inner circumference of the ring 18 are accurately ground, as indicated in Figure 4, by a grinding wheel 34 which is advanced as indicated in dotted lines along a guided path relative to the ring 18 for producing an accurately finished cylindrical bore surface 35 around the entire circumference of the ring 18. This surface extends outwardly from the rim 32a of the retainer 32 and is accurately sized to have close-running clearance relationship with the edge 33c of the flinger flange 33b. This flinger flange 33b overlies the flange 32b of the retainer 32 in close-running clearance relationship and the inner edge 32c of the flange 32b has close-running clearance relationship with the base 33a adjacent the flange 33b.

The base 33a of the flinger 33 has a sufficient axial length or depth to hold the flange 33b in fixed position on the ring 22 and this base is sized for press fit relationship with the ring 22. The end of the base 33 terminates in a vertical shoulder or sharp upstanding edge 33d which is spaced axially inward for a considerable distance from the edge 32c of the retainer 32. In operation of the bearing unit 11, the outer race ring 18 remains stationary with the pillow block 10 while the inner race ring 22 rotates with the shaft 12. The retainer 32 is therefore stationary while the flinger 33 rotates in close-running clearance relationship with the retainer and with the accurately ground portion 35 of the outer race ring. It is desirable to have this close-running clearance relationship in the order of .001 to .002 inch between the edge 33c and the surface 35; .005 to .010 inch between the lapped flanges 32b and 33b and .005 to .010 inch between the edge 32c and the base 32d. Maintenance of these close-running conditions will preclude binding of the parts and at the same time will prevent ingress of dirt or leakage of lubricant.

As illustrated in Figure 3, the sharp shoulder or edge 33d acts as a flinger for grease and prevents the grease from flowing under the edge 32c into the path between the flanges 32b and 33b. The grease, as indicated in dotted lines, will not strike against the flange 32b until it is well spaced from the edge 32c. Any grease which might reach the vicinity of the gap between the edge 32c and the base 33a will be precluded from entering this gap because of the very close clearance relationship between the relatively rotating surfaces which, in effect, form a closed seal. The sloping relationship of the gap or path between the flange 32b and 33b prevent direct centrifugal action of the flinger tending to throw grease radially out of the path, since this centrifugal action is broken up by the inward slope of the flinger. Conversely, ingress of dirt through the gap between the edge 33c and the surface 35 is prevented by centrifugal action, which tends to throw the dirt off of the flinger, and by the very close-running clearance relationship between the parts creating an effective seal. Of course, dirt cannot travel against the action of centrifugal force down through the path between the flanges 32b and 33b.

The seal 26 is therefore an efficient all-metal two-plate or ring arrangement which cooperates with the outer race ring to produce sealing results not heretofore obtainable in all-metal seals. For example, after 500 hours continuous testing, it was found that the seal 26 did not permit the ingress of dirt or the loss of lubricant.

In the modifications of Figure 5, two different types of seal assemblies 60 and 70 respectively are provided to seal the ball chamber C.

The seal 60 includes a metal retainer ring 61, a metal flinger ring 62, and a flexible sealing ring 63 preferably formed of felt. The retainer 61 has a flat axially extending outer rim flange 61a with an upstanding or radially outward end flange 61b at the axial outer end thereof. An inclined side wall 61c extends radially inward and axially outward from the axial inner end of the rim flange 61a at an angle of about 15° from the vertical or right angle relationship with the rim flange. The side wall 61c terminates in an axially outward extending inner rim flange 61d which overlies the inner race ring 22 in spaced parallel relation. The inner and outer rim flanges 61a and 61d are thus in spaced parallel relation to each other.

The retainer 61 has the outer rim flange 61a thereof pressed into the outer race ring 18 until the end flange 61b on this rim is bottomed against the outer face of the race ring as shown in Figure 5.

The flinger 62 includes a flat base 62a pressed onto the inner race ring 22 and a sloping side wall or flinger flange 62b extending radially outward and axially inward from the base in parallel relationship to the walls 61c of the retainer. The flinger wall 62b terminates in closely spaced relation with the rim flange 61a of the retainer adjacent the axial outer end of this flange to provide a small running clearance or gap 64.

The felt 63 is carried by the retainer and is pressed into the inclined relationship shown in Figure 5 by the side walls of the flinger and retainer respectively. The inner and outer rim flanges of the retainer plus the inclined side wall 61c form a sufficient friction grip on the felt so that this felt need not be cemented or otherwise bonded to the retainer. The friction grip will be sufficient to retain the felt in fixed relation with the retainer. This fixed relation may be created after initial use of the assembly.

The base 62a of the flinger extends beyond the inner edge of the side wall 61c of the retainer so as to provide a sharp edge or upstanding wall 65 which will fling off grease before the grease can reach the entrance mouth to the passage between the rim flange 61d and the base 62a. The grease will be thrown away from this entrance mouth well along the sloping side wall 61c.

The seal assembly 70 includes a metal retainer ring 71, a metal flinger 72, and a felt 73. The retainer 71 has a flat axially extending outer rim flange 71a pressed into the outer race ring 18 and is equipped with an unstanding or radially outwardly extending end flange 71b which is bottomed against the outer face of the race ring to provide a stop for the press fitting of the retainer in the race ring. A radially extending side wall 71c extends from the axial inner end of the rim flange 71a to an inner rim flange 71d which extends axially outward in spaced parallel relation from the inner race ring 22.

The flinger 72 has a flat base 72a pressed on the inner race ring 22 and underlying the inner rim flange 71d of the retainer in spaced parallel relation therewith. The flinger also has an inclined side wall 72b at an angle of about 15° from the vertical or right angle relationship with the base 72a. This flange 72b extends into closely spaced relation with the rim flange 71a and is inward from the outer end of this rim flange.

The felt 73 is confined between the inner and outer rims 71a and 71d of the retainer and between the side wall 71c and 72b of the retainer and flinger, respectively. Since the side wall 72b of the flinger is inclined and the side wall 71b of the retainer is radial, the felt 73 is compressed at the radially outer area thereof. In order to drive the felt with the flinger, the felt is preferably equipped with a flexible washer 74 secured to its outer face. This washer can be composed of neoprene or other synthetic rubber-like material or plastic. The washer is quite thin and is permanently bonded to the felt. This washer will have frictional engagement with the inclined flange 72b of the flinger and will be driven by the flinger to rotate the felt in the retainer.

As shown, the outer end of the flinger flange 72b terminates in spaced relation inward from the rim flange 71a to provide a gap 75. The neoprene washer 74 spans the inner end of this gap 75.

The inner terminal end of the base 72a provides a sharp shoulder 76 inwardly from the wall 71c of the retainer so that any grease attempting to enter the passage between the base 72a and the rim 71d will be flung outwardly away from the entrance mouth to this passage.

From the above description, it will be understood that this invention provides effective grease-retaining and dirt-excluding seals for industrial bearing units. The seals of this invention provide a labyrinth sealing passageway of relatively rotating parts which are maintained in such close-running clearance relationship that dirt cannot flow therethrough in one direction, nor can grease flow therethrough in the opposite direction.

It will be understood that modifications and variations may be effected without departing from the scope of the novel concepts of the present invention.

What is claimed is:

1. In a bearing unit having a pair of bearing rings disposed one within the other and held in radially spaced apart relatively rotatable relation and against relative axial movement the improvements of a first sealing ring having a rim flange press fitted on the inner periphery of the outer bearing ring and a side wall portion extending radially inwardly from said rim flange and axially outward at an angle therewith into spaced relation from the inner bearing ring, a second sealing ring having a base press fitted on the outer periphery of the inner bearing ring and underlying the inner end of the side wall of the first sealing ring, said base projecting axially inward beyond the inner end of the first sealing ring to provide a shoulder acting as a flinger for directing lubricant away from the gap between the base and inner end of the first sealing ring, said second sealing ring having a radially outward and axially inward extending flinger flange overlying the side wall of the first sealing ring, and the outer end edge of said flinger flange having an axially extending cylindrical surface in close-running clearance relation with an axially extending cylindrical surface on the inside of the outer bearing ring.

2. The combination with a pair of rings disposed one within the other, of a third ring carried by the outer ring and projecting into spaced relation from the inner ring, said third ring having a sloping wall portion disposed at an angle of about 15° from the vertical, a flinger having a flange parallel to said wall portion and spaced axially outward from said wall portion and a base press fitted on the outer periphery of the inner ring extending from said flange under the inner edge of the ring to a point spaced axially inward from the third ring, said base of the flinger having a terminal edge defining a grease-flinging shoulder, said flange of the flinger having an axially extending cylindrical outer edge, and said outer ring having an accurately ground axially extending cylindrical surface coacting with the outer edge of the flinger flange to form a close-running clearance sealing relationship therewith.

3. A sealed bearing unit comprising an outer race ring having a flat accurately ground inner cylindrical wall adjacent an outer face thereof, an inner race ring projecting into said outer race ring in spaced concentric relation therewith and having an axially extending portion beyond said face of the outer race ring, a metal retainer ring having a cylindrical rim press fitted on the inner periphery of the said outer race ring beyond said ground surface thereof and having a flange extending radially inwardly from said rim and axially outwardly at an angle therewith, said flange terminating in closely spaced relation to the inner race ring, a flinger member having a flange overlying said flange of the retainer in spaced parallel relation therewith and a base press fitted on the outer periphery of the inner race ring extending under the edge of the retainer flange and terminating in an upstanding shoulder axially inward from said edge, said flinger having an axially extending cylindrical free edge on said flange thereof terminating in close-running clearance relationship with the ground cylindrical surface on said outer race ring, said free edge and said ground surface having a running clearance gap therebetween within the range of .001 to .002 inch, said overlapping flanges of the retainer and flinger having a close-running clearance gap therebetween of not more than .01 inch, and said edge on the inner end of the retainer flange having close-running clearance relationship with said base of the flinger of not more than about .01 inch.

4. The combination with a pair of rings disposed one within the other and held in radially spaced apart relationship and against substantial relative movement in an axial direction, of a third ring having an axially extending cylindrical outer rim secured in the outer ring and a side wall extending radially inwardly from said rim and axially outwardly at an angle therewith surrounding the inner ring in spaced relationship, a flinger having a flange spaced axially outward from said third ring in parallel relationship with the side wall of said third ring and having a base underlying the side wall of said third ring, said flinger base having an upstanding terminal edge projecting beyond the inner edge of said side wall of the third ring to discharge grease away from the passage between the base and inner rim, and said flinger having an axially extending cylindrical edge on the outer end of the flange thereof in close-running underlapped parallel clearance relationship with the outer race ring.

5. A seal assembly comprising a retainer having an axially extending cylindrical outer rim flange, a radially outward extending end flange on one end of said rim flange, a side wall on the other end of said rim flange extending radially inwardly from said rim flange and axially outward at an angle therewith, and an axially outward extending inner rim flange at the inner end of said side wall, said outer rim flange being adapted to be pressed onto the inner periphery of the outer race ring of a bearing for carrying said inner rim flange in spaced parallel relation with the inner race ring of the bearing, a flinger having an axially inward extending base adapted to be pressed on the outer periphery of the inner race ring of the bearing in spaced radial relation with the inner rim flange of the retainer and a side wall on said flinger extending radially outwardly from said base and axially inward at an angle therewith in spaced parallel relation with the side wall of the retainer and terminating radially inward from the outer rim flange of the retainer, and a flexible sealing ring between the flinger and retainer and having inner and outer rim walls carried in the inner and outer rim flanges and opposed side faces inclined by the side walls of the retainer and flinger respectively.

6. A seal assembly comprising a retainer having an axially outward extending cylindrical outer rim flange, a radially outward extending end flange on one end of said rim flange, a radially inwardly extending side wall on the other end of said flange, said flange adapted to be press fitted on the inner periphery of the outer race ring of the bearing and said outwardly extending end flange adapted to be bottomed on the bearing, said side wall having an axially outward extending inner rim flange, a flinger having an axially extending cylindrical base adapted to fit within the inner rim flange of the retainer in spaced parallel relation therewith, a sloping side wall on said flinger terminating within the outer rim flange of the retainer, a flexible seal ring disposed in said retainer between the rim flanges thereof and bottomed on the radial side wall thereof, and a thin rubber-like washer secured on the outer face of the flexible sealing ring, said washer receiving the flinger side wall in frictional engagement therewith and being effective to drive the sealing ring with the flinger, said flexible sealing ring being compressed at the radial outer portion thereof by the inclined side wall of the flinger.

7. A seal assembly comprising a retainer having axial inner and outer rims and a side wall connecting said rims, a flinger having a base fitting within the inner rim of the retainer and a side wall adapted to span the space between the inner and outer rims, and a flexible sealing washer disposed between said inner and outer rims and between the side walls of the retainer and flinger respectively, said sealing washer filling the chamber between said side walls and said inner rim of the retainer and said base of the flinger providing therebetween a narrow passageway, the inner end of said base terminating inwardly beyond the side wall of the flinger to provide an upstanding surface adapted to fling grease away from the entrance mouth of said passageway.

8. In an industrial ball bearing unit having an outer race ring, and an inner race ring projecting therethrough in spaced rotatable relation therewith, the improvement of a seal defining one side of a grease chamber between the rings which comprises a metal retainer ring press fitted on the inner periphery of the outer race ring having a retainer flange extending across the space between the race rings, a flinger press fitted on the outer periphery of the inner race ring having a flinger base underlying the retainer flange in a close running clearance relation together with a flinger flange overlying the retainer flange, said flinger flange extending radially outward and axially inward from the inner race ring, and a free axially extending cylindrical edge on said flinger flange underlying and parallel with the inner periphery of the outer race ring in close running clearance relation therewith and spaced radially inward from the outer end of the outer race ring.

References Cited in the file of this patent

UNITED STATES PATENTS

| | | |
|---|---|---|
| 1,420,416 | Dlesk | June 20, 1922 |
| 1,986,621 | Bott | Jan. 1, 1935 |
| 2,189,838 | Shafer | Feb. 13, 1940 |
| 2,275,996 | Searles | Mar. 10, 1942 |
| 2,385,306 | Shafer | Sept. 18, 1945 |
| 2,403,687 | Shafer | July 9, 1946 |
| 2,441,294 | Shafer | May 11, 1948 |
| 2,705,160 | Shafer | Mar. 29, 1955 |
| 2,705,161 | Shafer | Mar. 29, 1955 |

OTHER REFERENCES

Plain and Laminated Felt Seals, Products Engineering, March, 1946. Pages 209–211.